(12) United States Patent
Zhao et al.

(10) Patent No.: US 11,156,739 B2
(45) Date of Patent: Oct. 26, 2021

(54) MILLIMETER WAVE SECURITY INSPECTION APPARATUS AND METHOD FOR INSPECTING HUMAN OR ARTICLE

(71) Applicant: Nuctech Company Limited, Beijing (CN)

(72) Inventors: Ziran Zhao, Beijing (CN); Yingkang Jin, Beijing (CN); Lingbo Qiao, Beijing (CN); Zhimin Zheng, Beijing (CN); Ming Xu, Beijing (CN); Xilei Luo, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 122 days.

(21) Appl. No.: 16/725,886

(22) Filed: Dec. 23, 2019

(65) Prior Publication Data

US 2020/0249373 A1     Aug. 6, 2020

(30) Foreign Application Priority Data

Dec. 28, 2018   (CN) .......................... 201811631615.9

(51) Int. Cl.
*G01N 21/3586*   (2014.01)
*G01V 8/00*       (2006.01)
*G03H 1/00*       (2006.01)

(52) U.S. Cl.
CPC .............. *G01V 8/005* (2013.01); *G03H 1/00* (2013.01)

(58) Field of Classification Search
CPC ........ G01V 8/005; G01V 8/20; G03H 1/0011; G01S 13/887; G01S 13/0209; G01S 13/87; G01S 13/90
See application file for complete search history.

(56) References Cited

U.S. PATENT DOCUMENTS

2011/0163231 A1   7/2011   Salmon
2015/0293221 A1   10/2015  Ahmed
(Continued)

FOREIGN PATENT DOCUMENTS

CN   203385856 U   1/2014
CN   108627880 A   10/2018
(Continued)

OTHER PUBLICATIONS

Extended European Search Report for corresponding European Patent Application No. 19219848.9 dated Jun. 5, 2020, 8 pages.

*Primary Examiner* — David P Porta
*Assistant Examiner* — Mamadou Faye
(74) *Attorney, Agent, or Firm* — Merchant & Gould P.C.

(57) ABSTRACT

The disclosure discloses a millimeter wave security inspection apparatus and a method for inspecting human or article. The apparatus includes: a door device including a first door and a second door arranged in a stacked mode and each made of a material allowing a millimeter wave to penetrate therethrough; a millimeter wave transceiver arranged between the first door and the second door and including an millimeter wave transceiving antenna array configured to transmit and receive a millimeter wave signal to and from an entrance side and an exit side of the door device; and a linear driver to which the millimeter wave transceiver is connected to be movable relative to the door device, so as to scan a first side of an object positioned at the entrance side and a second side of the object opposite to the first side positioned at the exit side.

17 Claims, 5 Drawing Sheets

(56) References Cited

U.S. PATENT DOCUMENTS

2019/0004170 A1* 1/2019 Morton ................ G01V 8/005
2019/0391531 A1* 12/2019 Qi ...................... G01S 13/9011

FOREIGN PATENT DOCUMENTS

| EP | 3 396 405 A1 | 10/2018 |
| EP | 3 399 333 A1 | 11/2018 |
| WO | 2016/161362 A1 | 10/2016 |

* cited by examiner ns to a technical field of security inspection, and more particularly, to a millimeter wave security inspection apparatus and a method for inspecting a human or article by using the millimeter wave security inspection apparatus.

MILLIMETER WAVE SECURITY INSPECTION APPARATUS AND METHOD FOR INSPECTING HUMAN OR ARTICLE

CROSS-REFERENCE TO RELATED APPLICATION

This application claims the priority benefit of Chinese Patent Application No. 201811631615.9 filed on Dec. 28, 2018, the whole disclosure of which is incorporated herein by reference.

FIELD OF THE DISCLOSURE

At least one embodiment of the present disclosure relates to a technical field of security inspection, and more particularly, to a millimeter wave security inspection apparatus and a method for inspecting a human or article by using the millimeter wave security inspection apparatus.

DESCRIPTION OF THE RELATED ART

In the prior arts, a security inspection apparatus, such as a security inspection apparatus for inspecting a human, usually operates with a millimeter wave imaging system. For example, CN203385856U discloses a millimeter wave three-dimensional holographic scanning imaging device comprising two millimeter wave transceiving antenna arrays horizontally positioned to perform double-sided scanning, a front side of the human is scanned by one of the two millimeter wave transceiving antenna arrays moving from top to bottom and a back side of the human is scanned by the other of the two millimeter wave transceiving antenna arrays moving from bottom to top. US2015/0293221A1 of Rohad & Schwarz GmbH & Co. discloses a millimeter wave imaging system with area array scanning, where in order to scan both sides of the human, the human needs to turn if only one plane array is used (QPS 100), or two plane arrays are used to scan front and back sides of the human (QPS 200). Thus, in order to scan the front and back sides of the human, two millimeter wave transceiving arrays (linear arrays or area arrays) are used in the prior arts, so that the cost is high; if only one array of millimeter wave transceiving antennas is used, the human needs to turn, thereby reducing the passing rate.

SUMMARY

An object of the present disclosure is to solve at least one of the above and other problems and defects existing in the prior arts.

According to an exemplary embodiment of an aspect of the present disclosure, there is provided a millimeter wave security inspection apparatus, comprising: a door device comprising a first door and a second door arranged in a stacked mode, each of the first door and the second door being made of a material allowing a millimeter wave to penetrate therethrough; a millimeter wave transceiver provided between the first door and the second door and comprising an millimeter wave transceiving antenna array configured to transmit a millimeter wave signal to an entrance side and an exit side of the door device, respectively, and to receive the millimeter wave signal reflected from the entrance side and the exit side of the door device, respectively; and a linear driver, the millimeter wave transceiver being connected to the linear driver to be movable between the first door and the second door relative to the door device under driving of the linear driver, so as to scan a first side of an object to be inspected in a state where the object is positioned at the entrance side and to a second side of the object opposite to the first side in a state where the object is positioned at the exit side.

In some embodiments, the millimeter wave transceiver comprises: a first millimeter wave transceiver comprising a first millimeter wave transceiving antenna array configured to transmit the millimeter wave signal to the entrance side of the door device and to receive the millimeter wave signal reflected from the entrance side of the door device; and a second millimeter wave transceiver comprising a second millimeter wave transceiving antenna array configured to transmit the millimeter wave signal to the exit side of the door device and to receive the millimeter wave signal reflected from the exit side of the door device.

In some embodiments, the millimeter wave transceiving antenna array comprises: a first millimeter wave transceiving antenna subarray adapted to transmit the millimeter wave signal to the entrance side of the door device and receive the millimeter wave signal reflected from the entrance side of the door device; a second millimeter wave transceiving antenna subarray adapted to transmit the millimeter wave signal to the exit side of the door device and receive the millimeter wave signal reflected from the exit side of the door device; and a switch adapted to switch between the first millimeter wave transceiving antenna subarray and the second millimeter wave transceiving antenna subarray.

In some embodiments, the millimeter wave transceiving antenna array is a linear array arranged in a horizontal direction, and the millimeter wave transceiver is moveable vertically relative to the door device.

In some embodiments, the millimeter wave transceiving antenna array is a linear array arranged in a vertical direction, and the millimeter wave transceiver is moveable horizontally relative to the door device.

In some embodiments, the millimeter wave security inspection apparatus further comprises a controller adapted to generate a control signal and transmit the control signal to the linear driver so that the linear driver drives the millimeter wave transceiver to move.

In some embodiments, the first door and the second door each comprise: a door frame; a sliding door panel being slidable relative to the door frame; and a sliding door panel driver connected to the controller and adapted to drive the sliding door panel to slide under control of the controller.

In some embodiments, the sliding door panel comprise a first sliding door panel and a second sliding door panel slidable in opposite directions relative to the door frame.

In some embodiments, the linear driver comprises: a linear transmission mechanism comprising a driven wheel rotatably connected to the door device and a conveyor belt, the millimeter wave transceiver being connected to the conveyor belt, wherein the door frame is provided with an accommodating groove adapted to accommodate the linear transmission mechanism therein; and a driving mechanism adapted to drive the conveyor belt of the linear transmission mechanism to move, the driving mechanism being connected to the controller.

In some embodiments, the millimeter wave security inspection apparatus comprises two said linear transmission mechanisms arranged on two opposite sides of the door frame.

In some embodiments, the millimeter wave security inspection apparatus further comprises: a data processor being connected to the millimeter wave transceiver wirelessly or in a wired means, so as to receive scan data obtained by the millimeter wave transceiver and generate a millimeter wave holographic image; and a display connected to the data processor and adapted to receive and display the millimeter wave holographic image from the data processor.

In some embodiments, the millimeter wave security inspection apparatus further comprises an isolation device provided at the exit side of the door device, the isolation device being connected to the controller to be opened or closed under control of the controller.

According to an exemplary embodiment of another aspect of the present disclosure, there is provided a method for inspecting a human or article by a millimeter wave security inspection apparatus, the method comprises following steps:

S1: positioning the human or article at an entrance side of a door device, and putting the millimeter wave transceiver in its scanning start position;

S2: driving the millimeter wave transceiver to horizontally or vertically move continuously or intermittently from the scanning start position to a scanning end position by means of a linear driver so as to scan a first side of the human or article;

S3: sending data obtained in a scanning process by the millimeter wave transceiver to a data processor during or after the scanning process;

S4: opening a first door and a second door of the door device after the first side has been scanned, so that the human or article reaches an exit side of the door device through the door device;

S5: driving the millimeter wave transceiver to horizontally or vertically move continuously or intermittently from the scanning end position to the scanning start position by means of the linear driver to scan a second side of the human or article opposite to the first side located at the exit side; and S6: processing, by the data processor, the data obtained by the millimeter wave transceiver to generate a millimeter wave holographic image of the human or article.

In some embodiments, the step S2 comprises: during the movement of the millimeter wave transceiver from the scanning start position to the scanning end position, scanning a first side of a second human or article at the entrance side by a first millimeter wave transceiver or a first millimeter wave transceiving antenna subarray, and scanning a second side of a first human or article at the exit side by a second millimeter wave transceiver or a second the millimeter wave transceiving antenna subarray at the same time.

In some embodiments, the step S5 comprises: during the movement of the millimeter wave transceiver from the scanning end position to the scanning start position, scanning a first side of another human or article at the entrance side by the first millimeter wave transceiver or the first millimeter wave transceiving antenna subarray, and scanning a second side of the second human or article located at the exit side by the second millimeter wave transceiver or the second millimeter wave transceiving antenna subarray at the same time.

In some embodiments, the method further comprises steps of identifying whether the human or article carries a suspicious object and a position of the suspicious object and outputting identified information after generating the millimeter wave holographic image of the human or article.

In some embodiments, the method further comprises keeping an isolation device closed when the human or article is identified as carrying a suspicious object, and opening the isolation device if the human or article is identified as not carrying a suspicious object.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF EXEMPLARY EMBODIMENTS

Figure 1:
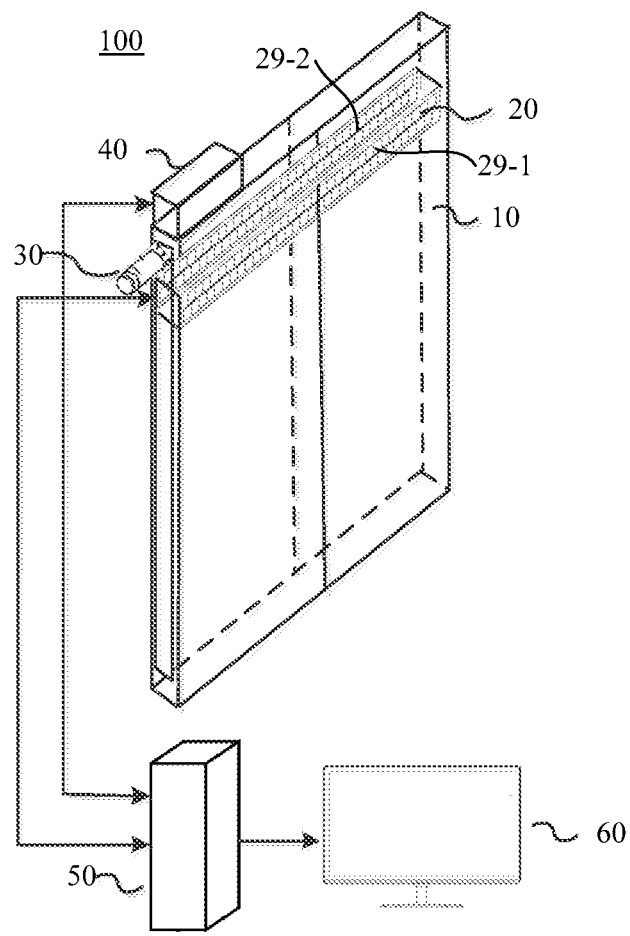
FIG. 1 is a schematic structural view illustrating a millimeter wave security inspection apparatus according to an exemplary embodiment of the present disclosure.

Although the present disclosure will be fully described with reference to the accompanying drawings including the preferred embodiments of the disclosure, before the description, it should be understand any modifications may be made in the described contents herein by those skilled in the art and obtain advantageous effects of the disclosure at the same time. Therefore, the above description is to be understood as a broad disclosure for those skilled in the art, and is not intended to limit the exemplary embodiments described herein.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general technical concept of the present disclosure, there is provided a millimeter wave security inspection apparatus, comprising: a door device comprising a first door and a second door arranged in a stacked mode, each of the first door and the second door being made of a material allowing a millimeter wave to penetrate therethrough; a millimeter wave transceiver arranged between the first door and the second door and comprising an millimeter wave transceiving antenna array configured to transmit a millimeter wave signal to an entrance side and an exit side of the door device, respectively, and to receive the millimeter wave signal reflected from the entrance side and the exit side of the door device, respectively; and a linear driver, the millimeter wave transceiver being connected to the linear driver to be movable between the first door and the second door relative to the door device under driving of the linear driver, so as to scan a first side of an object to be inspected in a state where the object is positioned at the entrance side and to a second side of the object opposite to the first side in a state where the object is positioned at the exit side.

FIG. 1 is a schematic structural view illustrating a millimeter wave security inspection apparatus 100 according to an exemplary embodiment of the present disclosure. As shown in FIG. 1, the millimeter wave security inspection apparatus 100 comprises a door device 10, a millimeter wave transceiver 20 and a linear driver 30. The door device 10 comprises a first door and a second door arranged in a stacked manner, each of the first door and the second door being made of a material allowing a millimeter wave to penetrate therethrough, such as polytetrafluoroethylene, polyethylene, or the like. The millimeter wave transceiver 20 is provided between the first door and the second door, and comprises an millimeter wave transceiving antenna array 29 configured to transmit a millimeter wave signal to an entrance side and an exit side of the door device 10, respectively, and to receive the millimeter wave signal reflected from the entrance side and the exit side of the door device 10, respectively. The millimeter wave transceiver 20 is connected to the linear driver 30 so as to be movable in a vertical direction between the first door and the second door relative to the door device 10 under driving of the linear driver 30. When an object 200 to be inspected is positioned at the entrance side of the door device 10, the door device 10 is closed, then the millimeter wave transceiver 20 transmits the millimeter wave signal to the entrance side of the door device 10 and receives the millimeter wave signal reflected by the object 200 to be inspected at the entrance side of the door device 10, and a first side (e.g., a front side) of the object 200 is scanned by the millimeter wave transceiver 20 while the millimeter wave transceiver 20 is moved in the vertical direction (e.g., from top to bottom); after the first-side has been scanned, the door device 10 opens to form a passage, so as to allow the object 200 to pass through the door device 10; and after the object 200 has passed through the door device 10, the door device 10 is closed, and then the millimeter wave transceiver 20 transmits a millimeter wave signal to the exit side of the door device 10 and receives the millimeter wave signal reflected by the object 200 at the exit side of the door device 10, and a second side (for example, a back side) of the object 200 is scanned by the millimeter wave transceiver 20 while the millimeter wave transceiver 20 is moved in the vertical direction (for example, from bottom to top). In this way, the first side and the second side opposite to the first side of the object 200 are scanned without turning the object 200 during a whole scanning process, thereby improving the passing rate. In addition, the millimeter wave security inspection apparatus 100 has a door-shaped structure so that the footprint area of the millimeter wave security inspection apparatus 100 is far smaller than that of the existing millimeter wave security inspection apparatus.

Figure 2:
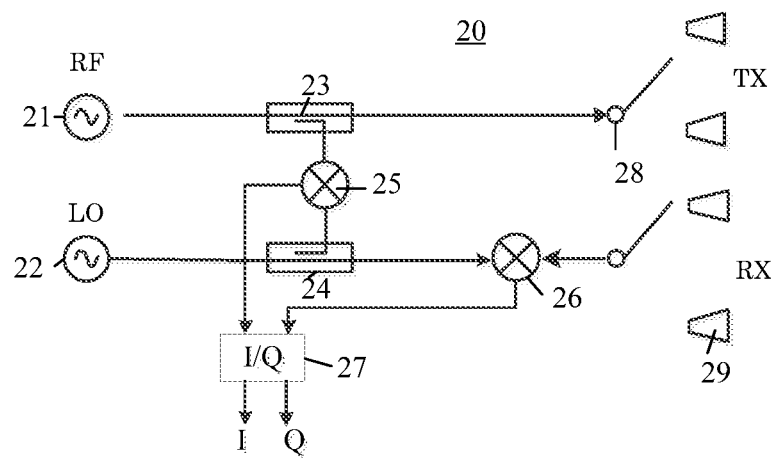
FIG. 2 is a diagram of a working principle of a millimeter wave transceiver according to an exemplary embodiment of the present disclosure.

In an exemplary embodiment, as shown in FIG. 2, the millimeter wave transceiver 20 comprises a millimeter wave emission source 21, a millimeter wave local oscillator 22, a first power divider 23, a second power divider 24, a first mixer 25, a second mixer 26, a I/Q demodulator 27, a switch 28 and the millimeter wave transceiving antenna array 29. The millimeter wave emission source 21 generates a millimeter wave signal, the first power divider 23 is connected to the millimeter wave emission source 21 and divides the millimeter wave signal emitted by the millimeter wave emission source 21 into two millimeter wave sub-signals, one millimeter wave sub-signal is output to a transmitting antenna array of the millimeter wave transceiving antenna array 29, and other millimeter wave sub-signal divided by the first power divider 23 and one millimeter wave sub-signal output from the millimeter wave local oscillator 22 and divided by the second power divider 24 are mixed by the first mixer 25 to form a reference signal; the other millimeter wave sub-signal output from the millimeter wave local oscillator 22 and divided by the second power divider 24 and a millimeter wave signal received by a receiving antenna array of the millimeter wave transceiving antenna array 29 are mixed by the second mixer 26 to form a measurement signal; the measurement signal and the reference signal are demodulated by the I/Q demodulator 27 to generate millimeter wave hologram data.

In an exemplary embodiment, as shown in FIGS. 1-4, the millimeter wave transceiving antenna array 29 is arranged on two opposite sides, and comprises a first millimeter wave transceiving antenna subarray 29-1 configured to transmit a millimeter wave signal to the entrance side of the door device 10 and to receive the millimeter wave signal reflected by the object 200 to be inspected at the entrance side of the door device 10, a second millimeter wave transceiving antenna subarray 29-2 configured to transmit a millimeter wave signal to the exit side of the door device 10 and to receive the millimeter wave signal reflected by the object 200 at the exit side of the door device 10, and a switch 28 adapted to switch the first millimeter wave transceiving antenna subarray 29-1 and the second millimeter wave transceiving antenna subarray 29-2. That is, the switch 28 may switch among a plurality of transceiving units of the first millimeter wave transceiving antenna subarray 29-1, switch among a plurality of transceiving units of the second millimeter wave transceiving antenna subarray 29-2, and switch between the plurality of transceiving units of the first millimeter wave transceiving antenna subarray 29-1 and the plurality of transceiving elements of the second millimeter wave transceiving antenna subarray 29-2. By quickly switching between the first millimeter wave transceiving antenna subarray 29-1 and the second millimeter wave transceiving antenna subarray 29-2 by the switch 28, it is possible to simultaneously inspect two objects 201, 202 positioning at the entrance side and the exit side of the door device 10, respectively. In this embodiment, a data processor 50 is connected to the first millimeter wave transceiving antenna subarray 29-1 and the second millimeter wave transceiving antenna subarray 29-2 by a wired or wireless connection to receive the data obtained by the first millimeter wave transceiving antenna subarray 29-1 and the second millimeter wave transceiving antenna subarray 29-2, respectively, and to generate corresponding millimeter wave hologram images, respectively.

In an exemplary embodiment, as shown in FIG. 1, each of the first millimeter wave transceiving antenna subarray 29-1 and the second millimeter wave transceiving antenna subarray 29-2 is a linear array arranged in a horizontal direction, and the millimeter wave transceiver 20 is moveable vertically relative to the door device 10. However, it will be appreciated by those skilled in the art that in some other embodiments of the present disclosure, the first millimeter wave transceiving antenna subarray 29-1 and the second millimeter wave transceiving antenna subarray 29-2 may also be linear arrays arranged in the vertical direction, and then the millimeter wave transceiver 20 may move horizontally relative to the door device 10. It is noted that the first millimeter wave transceiving antenna subarray 29-1 and the second millimeter wave transceiving antenna subarray 29-2 may alternatively be an area array, for example, including but not limited to a rectangular area array.

In an exemplary embodiment, as shown in FIG. 1, the millimeter wave security inspection apparatus 100 further comprises a controller 40 configured to generate a control signal and send the control signal to the linear driver 30 so that the linear driver 30 drives the millimeter wave transceiver 20 to move.

In an exemplary embodiment, as shown in FIGS. 1, 3 to 5, the door device 10 is automatic screen door, wherein the first door and the second door each comprise a door frame 11 and sliding door panels 12, 13 (14, 15) slidable relative to the door frame 11; here, the door frame of the first door and the door frame of the second door are integrated. Further, the door device 10 further comprises a sliding door panel driver (not shown) connected to the controller 40 and adapted to drive the sliding door panels 12, 13, 14, 15 to slide under control of the controller 40.

In an exemplary embodiment, as shown in FIGS. 1, 3 to 5, the sliding door panels 12, 13 (14, 15) comprise a first sliding door panel 12 (15) and a second sliding door panel 13 (14), the first sliding door panel 12 (15) and the second sliding door panel 13 (14) being slidable in two opposite directions relative to the door frame 11 to further shorten the opening and closing time of the door device 10, thereby improving the security inspection efficiency.

Figure 3:
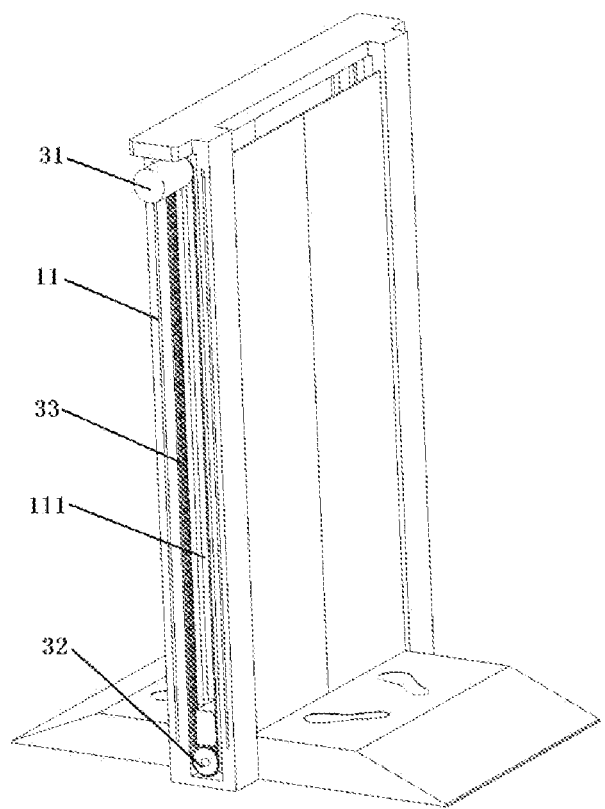
FIG. 3 is a schematic structural view illustrating a millimeter wave security inspection apparatus according to another exemplary embodiment of the present disclosure.

In an exemplary embodiment, as shown in FIGS. 1 and 3, the linear driver 30 comprises a linear transmission mechanism 31 and a driving mechanism 31. The linear transmission mechanism comprises a driven wheel 32 rotatably connected to the door device 10 and a conveyor belt 33 (e.g., a toothed belt) connected to the driving mechanism 31, and the millimeter wave transceiver 20 is connected to the conveyor belt 33 to move under driving of the conveyor belt 33. The door frame 11 is provided with a receiving groove 111 located between the first door and the second door and adapted to receive the linear transmission mechanism. The driving mechanism 31 (such as a gear motor) is adapted to drive the conveyor belt 33 of the linear transmission mechanism to move, and is connected to the controller 40 to drive the millimeter wave transceiver 20 to move under control of the controller 40. It should be noted that in other embodiments of the present disclosure, the linear driver 30 may be of other types, such as a linear actuator, a piston cylinder, etc.

In an exemplary embodiment, as shown in FIG. 1, the millimeter wave security inspection apparatus 100 may further comprise a data processor 50. The data processor 50 is connected to the millimeter wave transceiver 20 wirelessly or in a wired manner (for example, by a wire) to receive the data from the millimeter wave transceiver 20, and configured to generate the millimeter wave holographic image with high resolution by an image reconstruction algorithm, and to automatically identify a suspicious object by an automatic identification algorithm. The millimeter wave security inspection apparatus 100 may further comprise a display 60. The display 60 is connected to the data processor 50 and configured to receive and display the millimeter wave hologram image generated by the data processor 50. It should be noted that, in an exemplary embodiment, the controller 40 may be integrated with the data processor 50.

Figure 9:
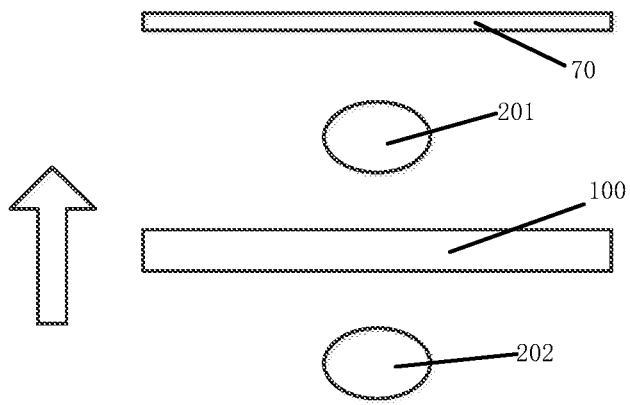
FIG. 9 is a schematic structural view illustrating a millimeter wave security inspection apparatus according to yet another exemplary embodiment of the present disclosure, wherein the millimeter wave security inspection apparatus comprises an isolation device.

In an exemplary embodiment, as shown in FIG. 9, the millimeter wave security inspection apparatus 100 further comprises an isolation device 70 provided at the exit side of the door device 10 and connected to the controller 40 to be opened or closed under control of the controller 40. In this way, after the object 200 has been inspected by the millimeter wave security inspection apparatus 100, the isolation device 70 will be opened if the object 200 does not carry any suspicious object, and if the object 200 carries a suspicious object, the isolation device is kept closed to intercept the object 200 and send out an alarm.

Figure 8:
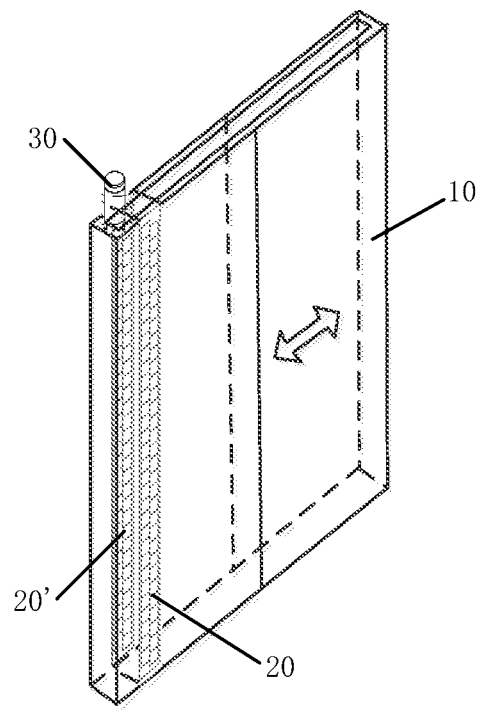
FIG. 8 is a schematic structural view illustrating a millimeter wave transceiver of a millimeter wave security inspection apparatus according to another exemplary embodiment of the present disclosure.

It should be noted that, although in this embodiment, the millimeter wave transceiving antenna array 29 of the millimeter wave transceiver 20 are arranged in a double-sided manner, it will be appreciated by those skilled in the art that in some other embodiments of the present disclosure, two millimeter wave transceivers placed back-to-back and close proximity to each other may be used, including a first millimeter wave transceiver 20 and a second millimeter wave transceiver 20' (shown in FIG. 8), wherein the first millimeter wave transceiver 20 comprises a first millimeter wave transceiving antenna array configured to transmit a millimeter wave signal to the entrance side of the door device 10 and to receive the millimeter wave signal reflected by the object 200 to be inspected at the entrance side of the door device 10; and the second millimeter wave transceiver comprises a second millimeter wave transceiving antenna array configured to transmit a millimeter wave signal to the exit side of the door device 10 and to receive the millimeter wave signal reflected by the object 200 at the exit side of the door device 10. Since the two millimeter wave transceivers are used, it is possible to simultaneously inspect two objects 201, 202 positioning at the entrance side and the exit side of the door device 10, respectively. In this embodiment, the data processor 50 is connected wirelessly or in a wired manner to the first millimeter wave transceiver 20 and the second millimeter wave transceiver 20' to receive the data from the first millimeter wave transceiver 20 and the second millimeter wave transceiver 20', respectively, so as to generate corresponding millimeter wave hologram images.

Figure 4:
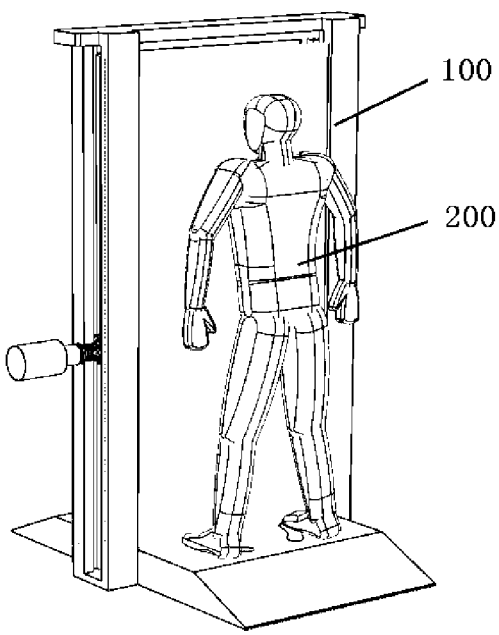
FIG. 4 is a perspective view illustrating a first-side (front-side) of an object to be inspected standing on an entrance side of a door device being scanned by a millimeter wave security inspection apparatus according to the present disclosure.
Figure 5:
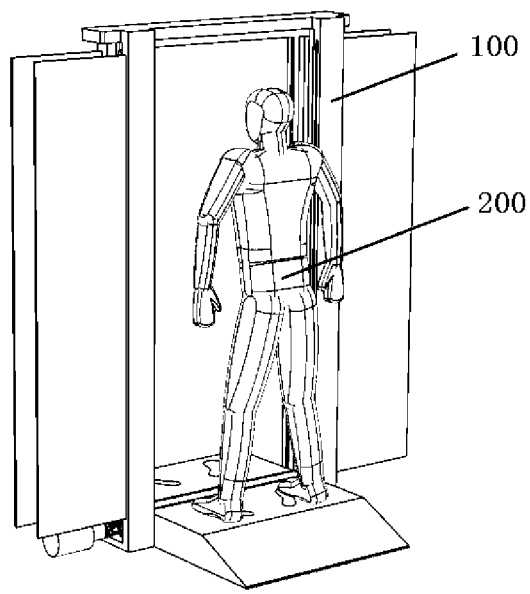
FIG. 5 is a schematic view of a state in which the door device is opened after the first-side of an object to be inspected has been scanned by the millimeter wave security inspection apparatus according to the present disclosure.
Figure 6:
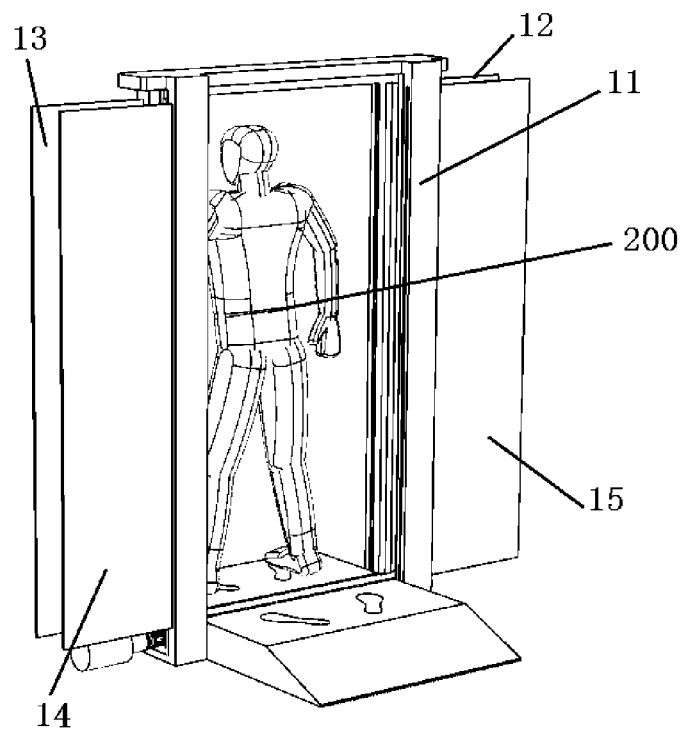
FIG. 6 is a schematic view of a state in which the inspected object passes through the door device of the millimeter wave security inspection apparatus.
Figure 7:
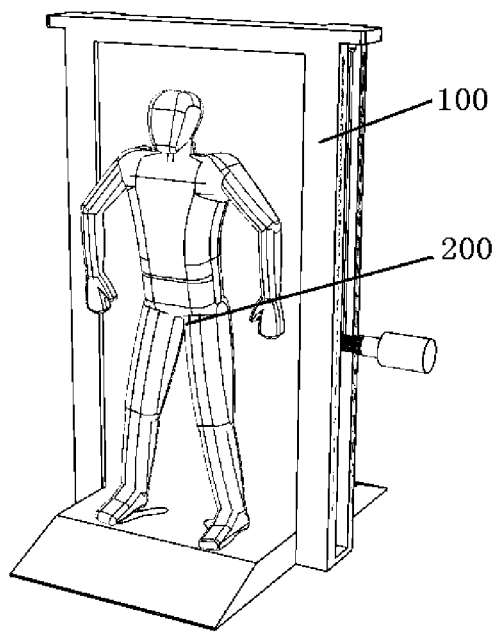
FIG. 7 is a schematic perspective view illustrating a second-side (back-side) of an object to be inspected standing on a exit side of a door device being scanned by a millimeter wave security apparatus according to the present disclosure.
Figure 10:
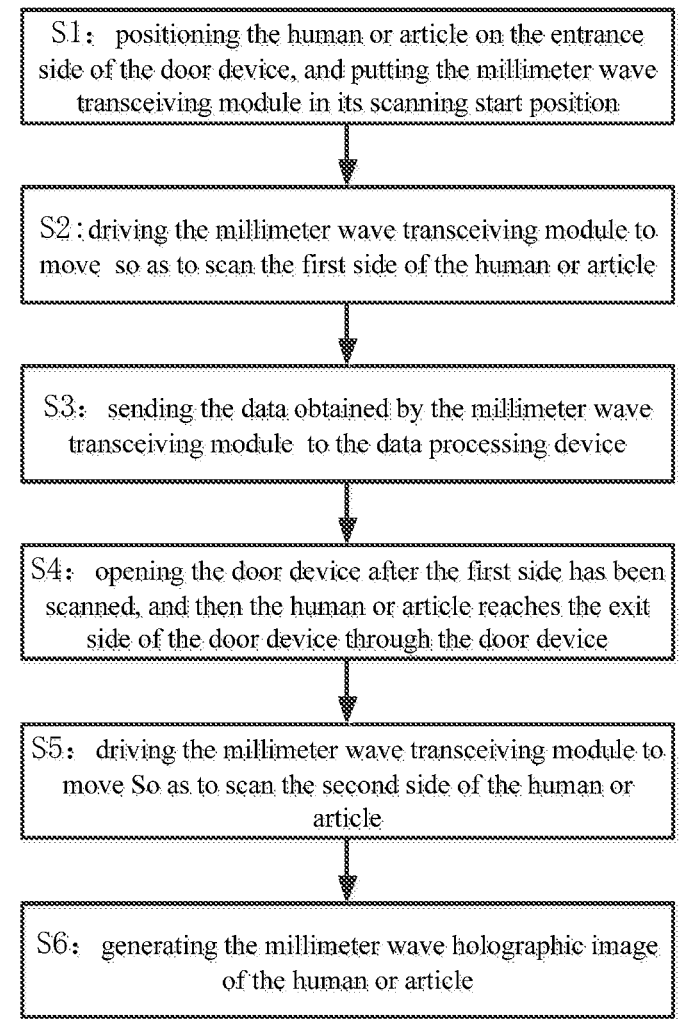
FIG. 10 is a flowchart of a method for inspecting a human or article according to an exemplary embodiment of the present disclosure.

The present disclosure also provides a method for inspecting a human or article by the millimeter wave security inspection apparatus, as shown in FIG. 10, the method including following steps:

step S1: positioning the human or article at the entrance side of the door device, and putting the millimeter wave transceiver in its scanning start position;

step S2: driving the millimeter wave transceiver to horizontally or vertically move continuously or intermittently from the scanning start position to a scanning end position by means of the linear driver so as to scan a first side of the human or article, as shown in FIG. 4;

step S3: sending data obtained in a scanning process by the millimeter wave transceiver to the data processor during or after the scanning process;

step S4: opening the first door and the second door of the door device after the first side has been scanned, so that the human or article reaches the exit side of the door device through the door device, as shown in FIGS. 5 and 6;

step S5: driving the millimeter wave transceiver to horizontally or vertically move continuously or intermittently from the scanning end position to the scanning start position by means of the linear driver to scan a second side of the human or article opposite to the first side at the exit side, as shown in FIG. 7; and step S6: processing, by the data processor, the data obtained by the millimeter wave transceiver to generate a millimeter wave holographic image of the human or article.

In an exemplary embodiment, the step S2 comprises: during the movement of the millimeter wave transceiver from the scanning start position to the scanning end position, scanning a first side of the second human or article 202 at the entrance side is scanned by the first millimeter wave transceiver 20 or by the first millimeter wave transceiving antenna subarray 29-1, and scanning a second side of the first human or article 201 at the exit side by the second millimeter wave transceiver 20' or by the second millimeter wave transceiving antenna subarray 29-2 at the same time, as shown in FIG. 9.

In an exemplary embodiment, the step S5 comprises: during the movement of the millimeter wave transceiver from the scanning end position to the scanning start position, scanning a first side of other human or article 202 at the entrance side by the first millimeter wave transceiver 20 or the first millimeter wave transceiving antenna subarray 29-1, and scanning a second side of the second human or article 202 at the exit side by the second millimeter wave transceiver 20' or by the second millimeter wave transceiving antenna subarray 29-2 at the same time.

In an exemplary embodiment, the method may further optionally comprise steps of automatically identifying whether the human or article carries a suspicious object and a position of the suspicious object and outputting identified information after generating the millimeter wave holographic image of the human or article. This will contribute to quickly identify the suspicious object and prevent security risks and is particularly beneficial in airports, customs, and other applications where a quick determination of security risks is required.

In an exemplary embodiment, the method may further optionally comprise steps of keeping the isolation device 70 closed when the human or article is identified as carrying a suspicious object, and opening the isolation device 70 if the human or article is identified as not carrying any suspicious object.

It will be understood by those skilled in the art that the above-described embodiments are exemplary and that modifications may be made by those skilled in the art, and that structures described in the various embodiments may be freely combined without conflict in structure or principle.

Although the preferred embodiments of the present disclosure have been described in detail, it will be apparent to those skilled in the art that various changes and modifications can be made without departing from the scope and spirit of the appended claims, and the disclosure is not limited to the exemplary embodiments illustrated in the specification.

What is claimed is:

1. A millimeter wave security inspection apparatus, comprising:
   a door device comprising a first door and a second door arranged in a stacked mode, each of the first door and the second door being made of a material allowing a millimeter wave to penetrate therethrough;
   a millimeter wave transceiver provided between the first door and the second door and comprising an millimeter wave transceiving antenna array configured to transmit a millimeter wave signal to an entrance side and an exit side of the door device, respectively, and to receive the millimeter wave signal reflected from the entrance side and the exit side of the door device, respectively; and
   a linear driver, the millimeter wave transceiver being connected to the linear driver to be movable between the first door and the second door relative to the door device under driving of the linear driver, so as to scan a first side of an object to be inspected in a state where the object is positioned at the entrance side and to a second side of the object opposite to the first side in a state where the object is positioned at the exit side.

2. The millimeter wave security inspection apparatus according to claim 1, wherein the millimeter wave transceiver comprises:
   a first millimeter wave transceiver comprising a first millimeter wave transceiving antenna array configured to transmit the millimeter wave signal to the entrance side of the door device and to receive the millimeter wave signal reflected from the entrance side of the door device; and
   a second millimeter wave transceiver comprising a second millimeter wave transceiving antenna array configured to transmit the millimeter wave signal to the exit side of the door device and to receive the millimeter wave signal reflected from the exit side of the door device.

3. The millimeter wave security inspection apparatus according to claim 1, wherein the millimeter wave transceiving antenna array comprises:
   a first millimeter wave transceiving antenna subarray adapted to transmit the millimeter wave signal to the entrance side of the door device and receive the millimeter wave signal reflected from the entrance side of the door device;
   a second millimeter wave transceiving antenna subarray adapted to transmit the millimeter wave signal to the exit side of the door device and receive the millimeter wave signal reflected from the exit side of the door device; and
   a switch adapted to switch between the first millimeter wave transceiving antenna subarray and the second millimeter wave transceiving antenna subarray.

4. The millimeter wave security inspection apparatus according to claim 1, wherein the millimeter wave transceiving antenna array is a linear array arranged in a horizontal direction, and the millimeter wave transceiver is moveable vertically relative to the door device.

5. The millimeter wave security inspection apparatus according to claim 1, wherein the millimeter wave transceiving antenna array is a linear array arranged in a vertical direction, and the millimeter wave transceiver is moveable horizontally relative to the door device.

6. The millimeter wave security inspection apparatus according to claim 1, further comprising a controller adapted to generate a control signal and transmit the control signal to the linear driver so that the linear driver drives the millimeter wave transceiver to move.

7. The millimeter wave security inspection apparatus according to claim 6, wherein the first door and the second door each comprise:
   a door frame;
   a sliding door panel being slidable relative to the door frame; and a sliding door panel driver connected to the controller and adapted to drive the sliding door panel to slide under control of the controller.

8. The millimeter wave security inspection apparatus according to claim 7, wherein the sliding door panel comprise a first sliding door panel and a second sliding door panel slidable in opposite directions relative to the door frame.

9. The millimeter wave security inspection apparatus according to claim 7, wherein the linear driver comprises:
a linear transmission mechanism comprising a driven wheel rotatably connected to the door device and a conveyor belt, the millimeter wave transceiver being connected to the conveyor belt, wherein the door frame is provided with an accommodating groove adapted to accommodate the linear transmission mechanism therein; and
a driving mechanism adapted to drive the conveyor belt of the linear transmission mechanism to move, the driving mechanism being connected to the controller.

10. The millimeter wave security inspection apparatus according to claim 9, comprising two said linear transmission mechanisms arranged on two opposite sides of the door frame.

11. The millimeter wave security inspection apparatus according to claim 6, further comprising:
a data processor being connected to the millimeter wave transceiver wirelessly or in a wired means, so as to receive scan data obtained by the millimeter wave transceiver and generate a millimeter wave holographic image; and
a display connected to the data processor and adapted to receive and display the millimeter wave holographic image from the data processor.

12. The millimeter wave security inspection apparatus according to claim 11, further comprising an isolation device provided at the exit side of the door device, the isolation device being connected to the controller to be opened or closed under control of the controller.

13. A method for inspecting a human or article by a millimeter wave security inspection apparatus, comprising following steps:
S1: positioning the human or article at an entrance side of a door device, and putting the millimeter wave transceiver in its scanning start position;
S2: driving the millimeter wave transceiver to horizontally or vertically move continuously or intermittently from the scanning start position to a scanning end position by means of a linear driver so as to scan a first side of the human or article;
S3: sending data obtained in a scanning process by the millimeter wave transceiver to a data processor during or after the scanning process;
S4: opening a first door and a second door of the door device after the first side has been scanned, so that the human or article reaches an exit side of the door device through the door device;
S5: driving the millimeter wave transceiver to horizontally or vertically move continuously or intermittently from the scanning end position to the scanning start position by means of the linear driver to scan a second side of the human or article opposite to the first side located at the exit side; and
S6: processing, by the data processor, the data obtained by the millimeter wave transceiver to generate a millimeter wave holographic image of the human or article.

14. The method according to claim 13, wherein the step S2 comprises:
during the movement of the millimeter wave transceiver from the scanning start position to the scanning end position, scanning a first side of a second human or article at the entrance side by a first millimeter wave transceiver or a first millimeter wave transceiving antenna subarray, and scanning a second side of a first human or article at the exit side by a second millimeter wave transceiver or a second the millimeter wave transceiving antenna subarray at the same time.

15. The method according to claim 14, wherein the step S5 comprises:
during the movement of the millimeter wave transceiver from the scanning end position to the scanning start position, scanning a first side of another human or article at the entrance side by the first millimeter wave transceiver or the first millimeter wave transceiving antenna subarray, and scanning a second side of the second human or article located at the exit side by the second millimeter wave transceiver or the second millimeter wave transceiving antenna subarray at the same time.

16. The method according to claim 13, further comprising steps of identifying whether the human or article carries a suspicious object and a position of the suspicious object and outputting identified information after generating the millimeter wave holographic image of the human or article.

17. The method according to claim 13, further comprising:
keeping an isolation device closed when the human or article is identified as carrying a suspicious object, and opening the isolation device if the human or article is identified as not carrying a suspicious object.

* * * * *